United States Patent [19]

Irick et al.

[11] Patent Number: 4,990,885

[45] Date of Patent: Feb. 5, 1991

[54] AUXILIARY BATTERY MONITOR

[75] Inventors: W. Thomas Irick, New Haven; Michael R. Singer, Fort Wayne, both of Ind.

[73] Assignee: Navistar International Transportation Corp., Chicago, Ill.

[21] Appl. No.: 419,989

[22] Filed: Oct. 11, 1989

[51] Int. Cl.$^5$ .............................................. B60Q 1/00
[52] U.S. Cl. ..................................... 340/455; 320/6; 320/48; 324/433; 340/636
[58] Field of Search ............... 340/455, 636; 307/10.1, 307/10.7; 361/92; 320/48, 6; 324/433, 435

[56] References Cited

U.S. PATENT DOCUMENTS

| | | | |
|---|---|---|---|
| 3,340,402 | 9/1967 | Curtis | 307/10.7 |
| 3,763,415 | 10/1973 | Ownby | 320/6 |
| 4,316,133 | 2/1982 | Locke, Jr. | 340/636 |
| 4,413,234 | 11/1983 | Lupoli | 340/636 |
| 4,665,370 | 5/1987 | Holland | 340/636 |
| 4,761,631 | 8/1988 | Hwang | 340/455 |
| 4,857,807 | 8/1989 | Hargis | 340/431 |
| 4,902,956 | 2/1990 | Sloan | 320/40 |
| 4,929,931 | 5/1990 | McCuen | 340/455 |

Primary Examiner—Joseph A. Orsino
Assistant Examiner—Brent A. Swarthout
Attorney, Agent, or Firm—F. David AuBuchon; Dennis K. Sullivan

[57] ABSTRACT

The electrical system of a vehicle includes a primary voltage source for starting and operating the engine of the vehicle and an auxiliary voltage source for operating the electrical accessories of the vehicle, particularly when the engine is not operating, and a voltage differential monitor circuit for warning the vehicle operator of the existence of a low voltage condition of the auxiliary battery, such as resulting from an auxiliary battery charging system failure which could result in the inability of an electrical accessory to operate even when the engine is operating. The voltage differential between the primary and auxiliary sources is measured by coupling same to a voltage comparison device, namely a pair of voltage dividing resistor pairs providing inputs to an operational amplifier in which an output is turned on when the voltage differential is above a predetermined value determined by the voltage division ratio of the resistors causing the amplifier to direct a signal to a switching device, a field effect transistor, which in turn completes a circuit to a lamp causing same to become illuminated, the illuminated lamp warning the operator of the system failure.

14 Claims, 6 Drawing Sheets

4,990,885

AUXILIARY BATTERY MONITOR

BACKGROUND OF THE INVENTION

This invention relates generally to electrical systems for vehicles of the type which includes a primary battery to provide electrical power for the purpose of starting and operating the vehicle engine and an auxiliary battery to provide voltage sufficient for the operation of electrical accessories of the vehicle. More particularly, the invention provides an auxiliary battery monitor capable of effecting an alarm signal to the operator of the vehicle indicating a low voltage condition of the auxiliary battery in the event that a failure of any component in the electrical system occurs and results in one or more of the accessories failing to operate if the vehicle is driven subsequent to an overnight rest stop or similar period of inactivity.

Many of the electrical accessories employed in vehicles, particularly of the tractor/trailer type, often impose extraordinary electrical loads on the normal power supplies provided with this type of vehicle, especially when the engine is not operating. Such a load may well result in battery stress which in turn may cause difficulty in starting the engine and difficulty in charging the battery sufficiently once the engine is operating. In view of the extraordinary load upon the normal battery caused by the operation of the electrical accessories, such as the radio, dome lamps, tail lamps, other communications equipment such as CB units, auxiliary power supplies have been provided, such as an auxiliary battery, to supplement the primary battery and often exclusively to meet the electrical load constituted by these accessories. The auxiliary power supplies often are the exclusive power source for the electrical accessories, especially while the engine is inactive such as would occur during an overnight rest stop or similar occurrence.

Failures occur in various components of the electrical system, such as the charging devices, including the voltage regulator means and/or the alternator, where provided, or upon failure of the electrically operated solenoid switch means which may disconnect the charging devices from the batteries. One result is draining the charge from the auxiliary battery sufficiently that accessories such as the tail lamps may fail, even subsequent to the starting and operation of the engine. If the auxiliary battery output voltage is reduced below the output voltage required to operate one or more of the accessories, the primary battery may nevertheless have sufficient charge so that the engine can be started and operated to enable the vehicle to be driven after such layover. The voltage output of the auxiliary battery could nevertheless be incapable of supporting the operation of the tail lamps, for example. Under such conditions, the operator of the vehicle could start the engine and proceed along the road without having knowledge that accessories such as the tail lamps may not be operational.

SUMMARY OF THE INVENTION

Accordingly, it is an object of the invention described and claimed herein to provide means for monitoring the voltage output of the auxiliary battery so that a warning may be issued to the operator that the voltage supplied by the auxiliary battery is insufficient to operate one or more of the electrical accessories although the engine can be started and the vehicle driven.

A more specific object of the invention is to provide means which measure the differential voltage between the primary and auxiliary batteries and provide an observable signal to the operator should such differential rise to a level indicating a potential system failure resulting from the auxiliary battery output voltage level being incapable of operating one or more of the electrical accessories.

The invention provides, for use in the electrical system of a vehicle of the type including a primary voltage source for starting and operating the engine of the vehicle and an auxiliary voltage source for operating the electrical accessories of the vehicle, particularly when the engine is not operating, a monitor for warning the operator of the vehicle of existence of a condition conducive to an electrical system failure which could result in the inability of an electrical accessory to operate even when the engine is operating. The voltage differential between the primary and auxiliary voltage sources is measured by coupling said sources respectively to a voltage comparison device. At the occurrence of a predetermined voltage differential, a signal is directed to a switching device which effects illumination of a warning lamp for alerting the vehicle operator of such condition.

DESCRIPTION OF PREFERRED EMBODIMENT

The invention herein is intended for use as an element within the electrical system of vehicles of the type having a primary voltage source, such as an alternator fed primary battery array, for starting and operating the engine and an auxiliary voltage source, such as a deep cycle battery, for operating the electrical accessories of the vehicle, such as the communications equipment, dome lamps, tail lamps and the like, particularly when the engine is not running.

There will be described hereinafter a voltage differential monitor capable of providing an alarm signal to alert the vehicle operator of a condition of potential system failure as a result of which the engine could be started and the vehicle driven with one or more of the accessories inoperative. This event could occur, for example, if the alternator would fail to supply charging voltage to the auxiliary battery due to the failure of a solenoid switch to operate properly. Since the auxiliary battery may provide the sole power to operate the accessories of the vehicle, this battery undergoes considerable stress with the result that even when the engine is started, a low voltage condition may prevent such accessories as the tail lamps from operating even when the engine is operating with the operator of the vehicle being without knowledge of this condition.

Figure 1:
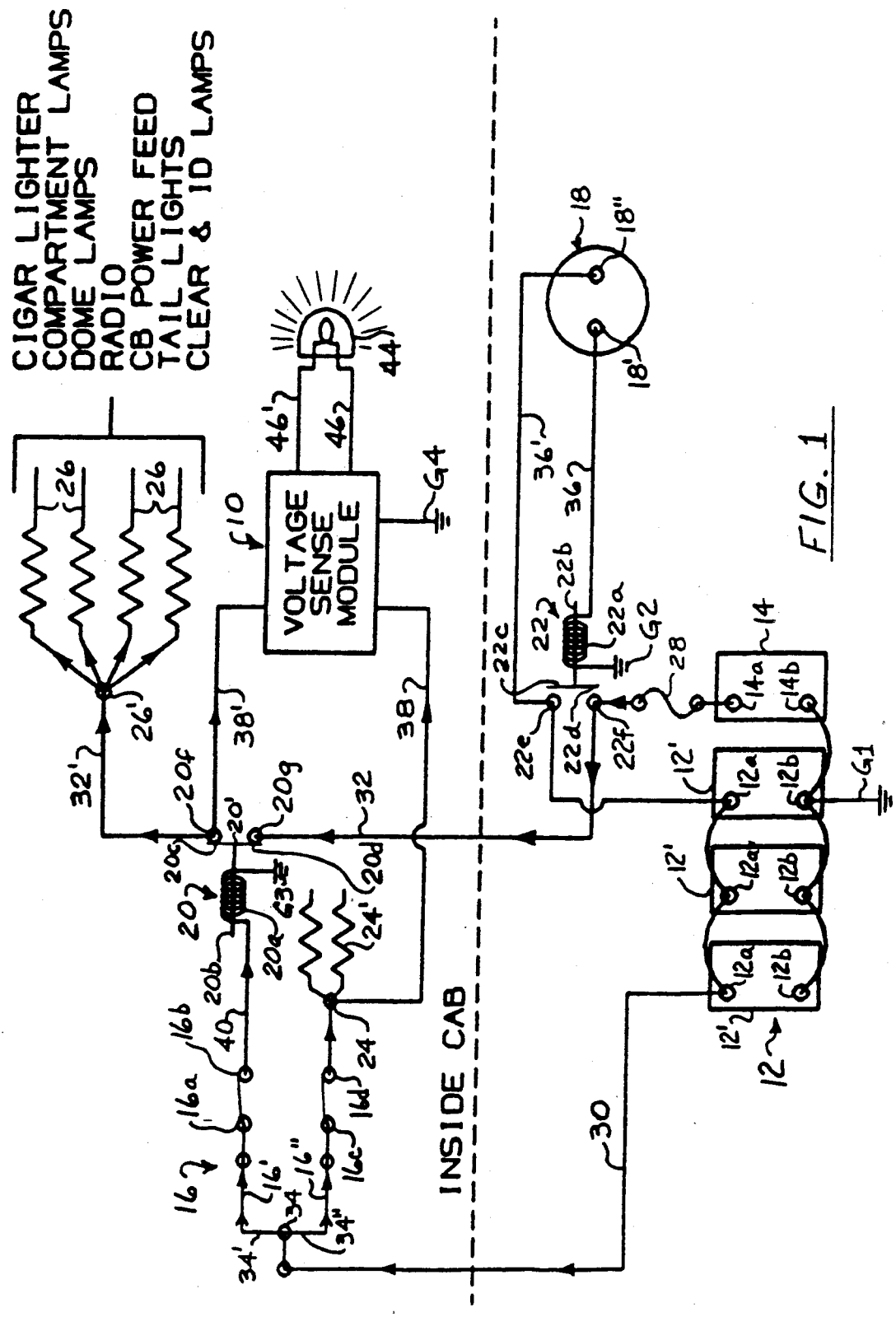
FIGS. 1 through 5 are schematic representations illustrating the operation of the auxiliary battery voltage monitor conditions of the vehicle; and, FIG. 6 is an electrical circuit diagram representing the auxiliary battery voltage monitor the invention.

Referring to FIG. 1 of the drawings, there is illustrated the auxiliary battery voltage monitor of the invention incorporated in the electrical system of a vehicle, said monitor being designated generally by reference character 10, details of the monitor 10 being illustrated in FIG. 6 and described below. The electrical system of the vehicle additionally includes a primary voltage source, primary battery array 12, and an auxiliary voltage source, the deep cycle auxiliary battery 14, an ignition switch 16, an alternator 18, a pair of solenoid-operated switches 20 and 22, an array of leads 24 to the ignition system and an array 26 of electrical accessories, such as a cigar lighter, compartment lamps, dome lamps, radio, CB power feed, tail lamps, clearance and ID lamps, etc. The ignition switch 16 includes a branch 16' leading to a switch arm 16a which, when closed upon contact 16b, leads to solenoid-operated switch 20. The ignition switch 16 also includes a branch 16" which leads to ignition switch arm 16c which, when closed upon contact 16d, leads to the distribution terminal 24, thence to the lead array 24' to the engine electrical controls, such as a fuel shutoff solenoid (not shown) associated with a diesel engine.

The primary battery array 12 includes plural (here, three) batteries 12' arranged connected in parallel with their positive terminals 12a connected and their negative terminals 12b also connected, one terminal 12a being connected to the 12 volt output terminal 18" of the alternator, and another terminal 12a connected to the ignition switch 16 by lead 30 to contact 34 to supply the required power to the branches 16' and 16". One of the terminals 12b is connected to ground G1.

The "deep cycle" auxiliary battery 14 has a negative terminal 14b connected to terminals 12b of the battery array 12 and thence to ground G1. The positive terminal 14a of the auxiliary battery is connected to the fusible link 28.

The solenoid operated charging switch 22 consists of a coil 22a, one end of which is connected to ground G2 and the opposite end being connected via lead 36 to the "R" terminal 18' of the alternator 18. The plunger 22b passes through the coil 22a and carries a cross-arm 22c terminating in contacts 22d. The contacts 22d engage contacts 22e and 22f. When the solenoid switch 22 is de-energized, the contacts 22d are spaced from contacts 22e and 22f. When the solenoid 22 is energized by the presence of a voltage at the "R" terminal of the alternator, contacts 22d engage contacts 22e and 22f connecting the alternator output 18" to the auxiliary battery 14, thus delivering charging current to said auxiliary battery 14 when the engine is operating. Lead 36 is connected to the lead 32 by engagement of contact 22d with contact 22f. Lead 32 is directed from the contact 22f to contact 20g of solenoid switch 20.

Accessory solenoid switch 20 includes coil 20a, one end of which is connected to ground G3 and the opposite end connected via line 40 to contact 16b and through switch 16a to line 34' and terminal 34. The solenoid switch 20 also includes arm 20b carrying cross-arm 20' terminating in said contacts 20c and 20d. In the energized condition of the solenoid switch 20, contacts 20c and 20d are engaged with contacts 20f and 20g. Lead 32' is directed from contact 20f to the distribution terminal 26' and therefrom, to the individual elements of the accessory array 26. Ignition distribution terminal 24 is coupled by ignition switch arm 16c engaging contact 16d and the primary battery array 12 is coupled via contact 34 and lead 34" via lead 30 connected to terminal 12a of battery array 12. The inputs to the voltage sense monitor 10 are coupled via leads 38' and 38 respectively to the accessory contact 20f and ignition distribution terminal 24. The voltage sense monitor 10 is coupled to the lamp 44 via leads 46 and 46' and also is connected to ground G4. It will be appreciated that the foregoing description, with the exception of the voltage sense monitor 10 and its connections to the circuit, is that of a conventional sacrificial battery system for powering truck accessories, especially for overnight stopovers with the engine not running.

In FIG. 1, the engine is not operating but the ignition switch 16 is disposed with both the ignition switch 16c and the accessory switch 16a in the "on" condition and the current flow is as illustrated by the arrows on the various lines. The solenoid 20 is energized to cause contacts 20c and 20d to be engaged with contacts 20f and 20g. The charging switch 22 is in the open condition because the engine is not turning the alternator to create a voltage at the "R" terminal. Accordingly, the alternator 18 is disengaged from the battery array 12 and from the auxiliary battery 14. The auxiliary battery 14 is connected to the accessory array 26 so as to operate the same, causing a drain on said auxiliary battery. The lamp 44 is illuminated, as the monitor 10 has sensed a high value voltage differential. The battery array 12 is connected to the ignition distributor 24 and thence to the ignition lead array 24' so that the engine can be started when desired.

Figure 2:
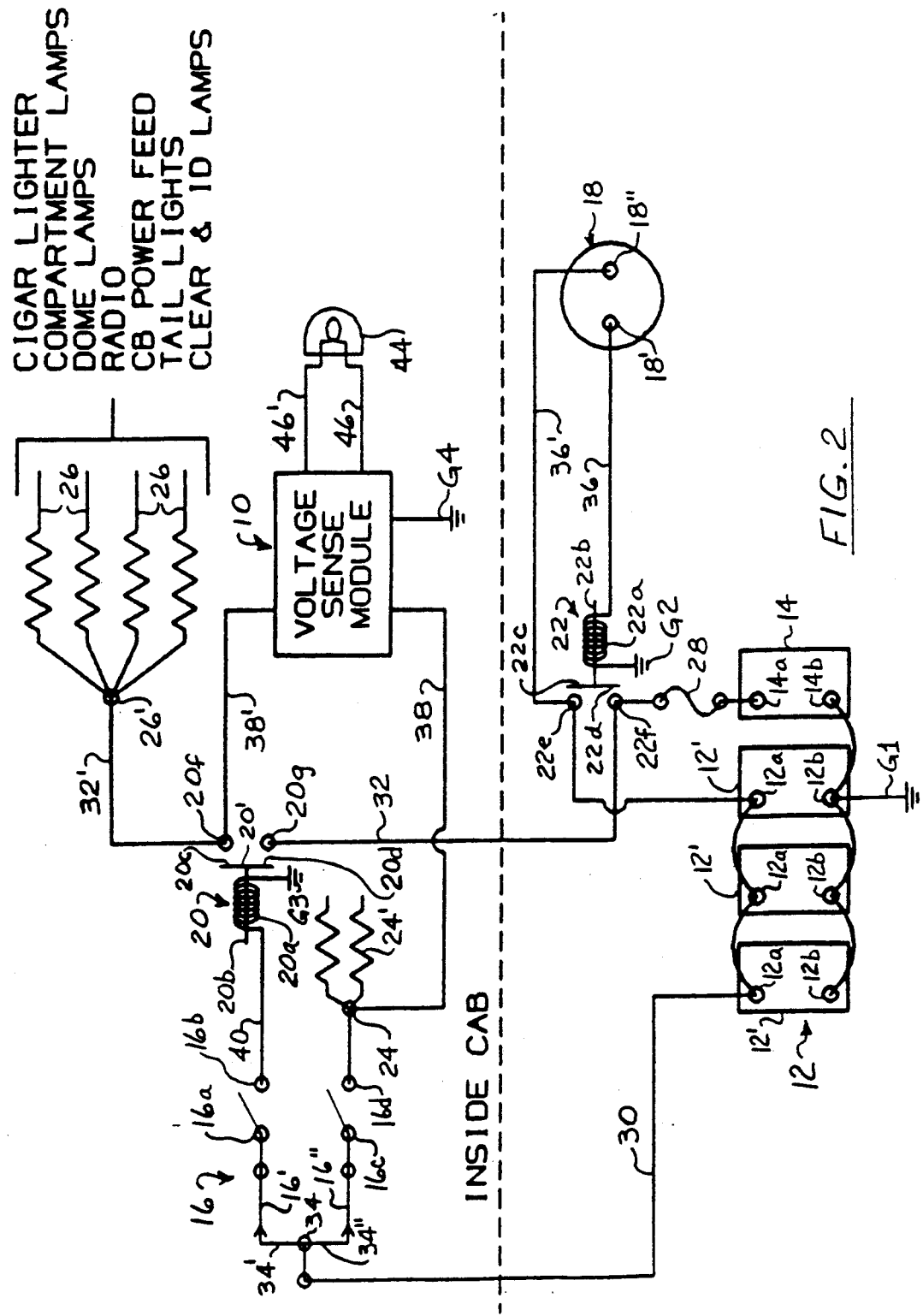

In FIG. 2, the engine is not running and both the solenoid switches 20 and 22 are in open condition. No voltage is directed from either battery array 12 or from auxiliary battery 14 to either the accessory array 26 or the ignition lead array 24'. The lamp 42 is not illuminated since the monitor 10 has sensed no excessive voltage differential and there is no failure of any element of the electrical system.

Figure 3:
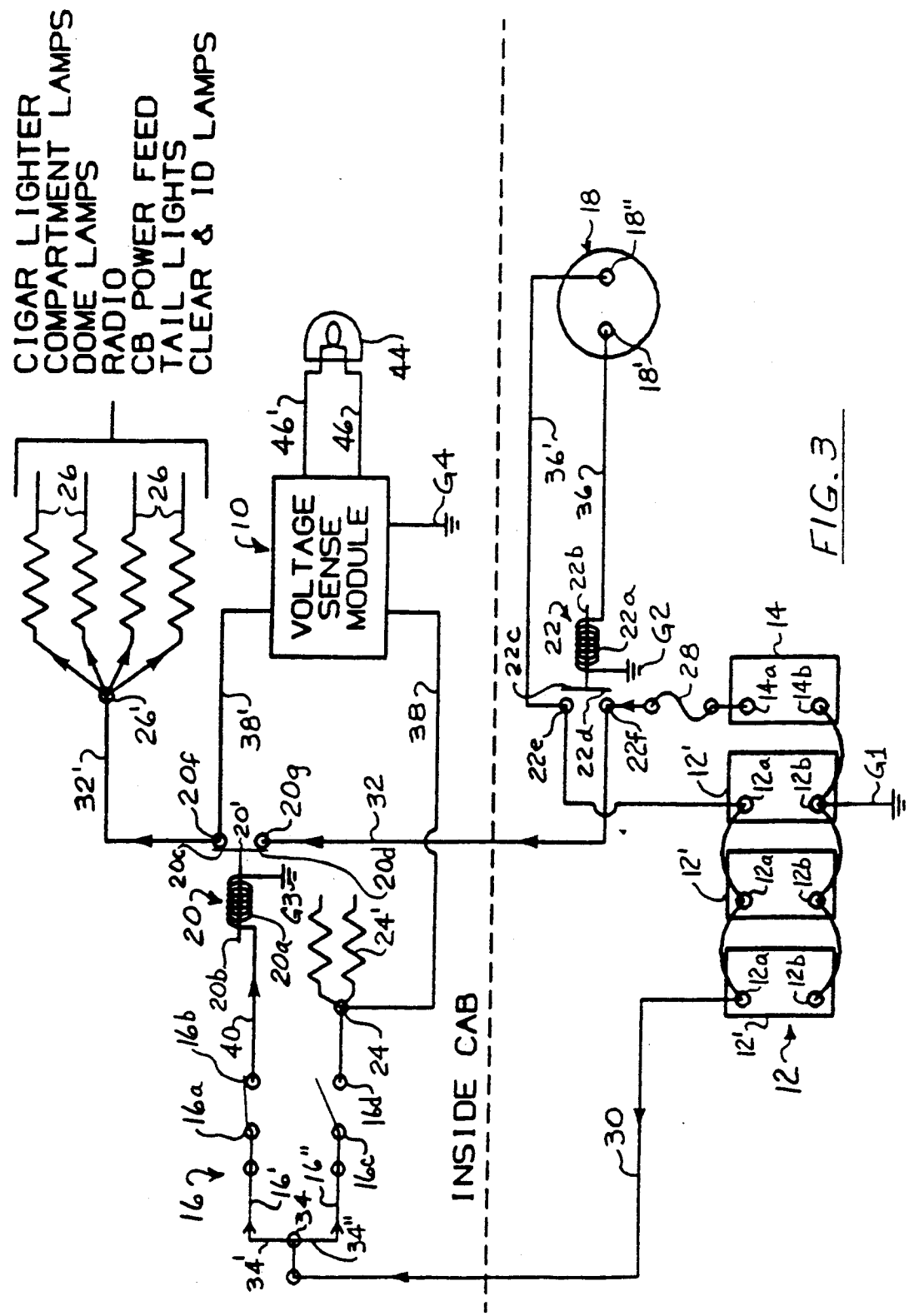

In FIG. 3, the engine is not running, the accessory switch 16a is engaged with contact 16b, the ignition switch arm 16c is not engaged with the ignition contact 16d and the solenoid switch 20 is energized so that the accessory array 26 draws voltage from the auxiliary battery 14 while the ignition distribution terminal 24 is disengaged from the primary battery array 12. The solenoid operated switch 22 is in open condition so that there is no charging voltage directed to the auxiliary battery 14. Although there is a substantial voltage differential across the voltage sense monitor 10, the lamp 42 is not illuminated because, as will be seen in connection with FIG. 6, both the monitor and the lamp derive their operating power from the line 38 to the ignition switch 16c which is open.

Figure 4:
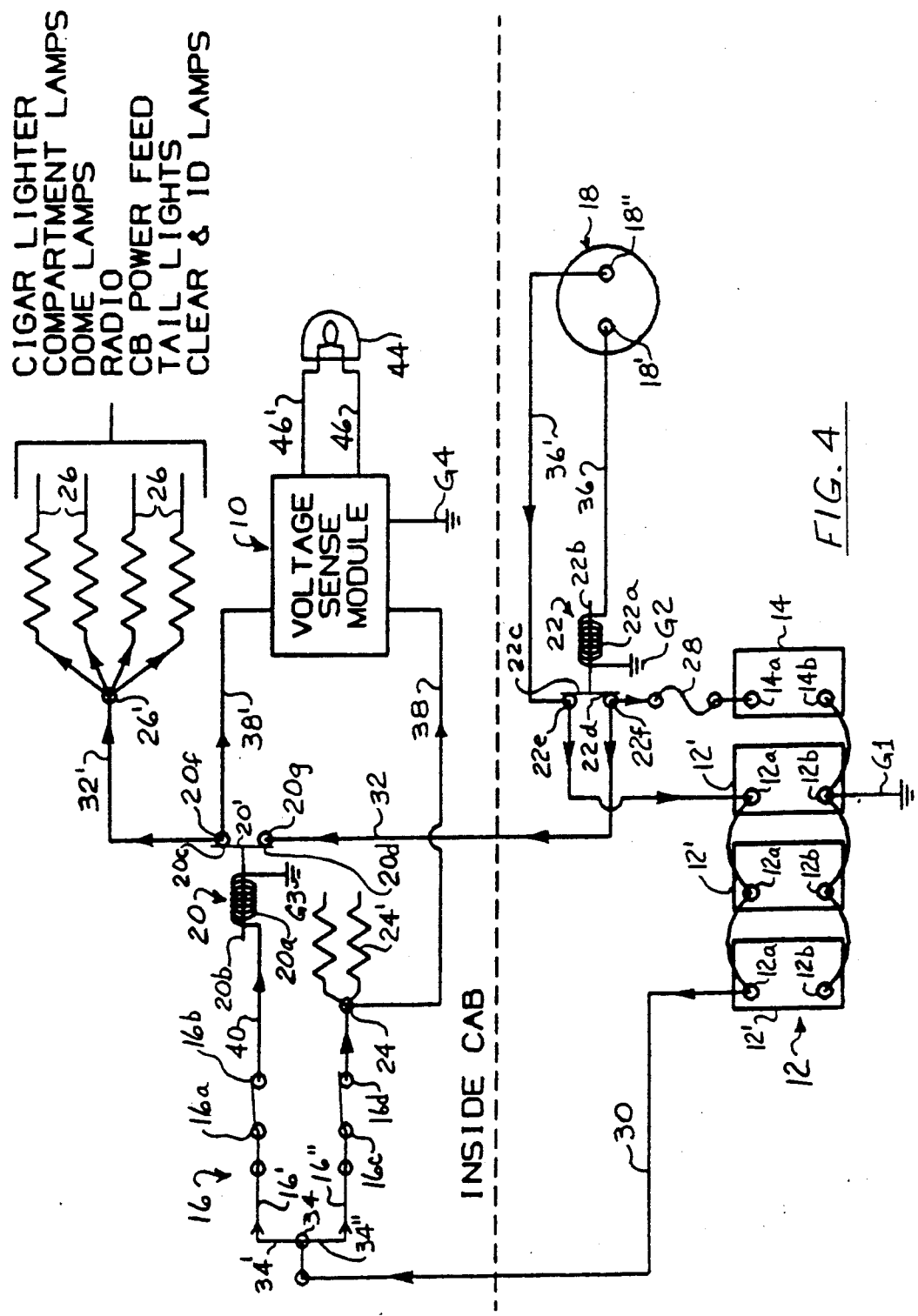

In FIG. 4, the condition illustrated is when the engine has been started and is running. The solenoid operated accessory switch 20 is closed. Voltage from the primary battery array 12 is directed to the ignition lead array 24' and voltage from the auxiliary battery 14 is directed to the accessory array 26. The solenoid charging switch 22 is closed because voltage is present at the "R" terminal of the alternator 18, and so the alternator is directing charging voltage both to the battery array 12 and to the auxiliary battery 14 and all the elements of the electrical system functioning with the engine operating. Again, there is no low voltage condition existent and the lamp 44 is not illuminated.

Figure 5:
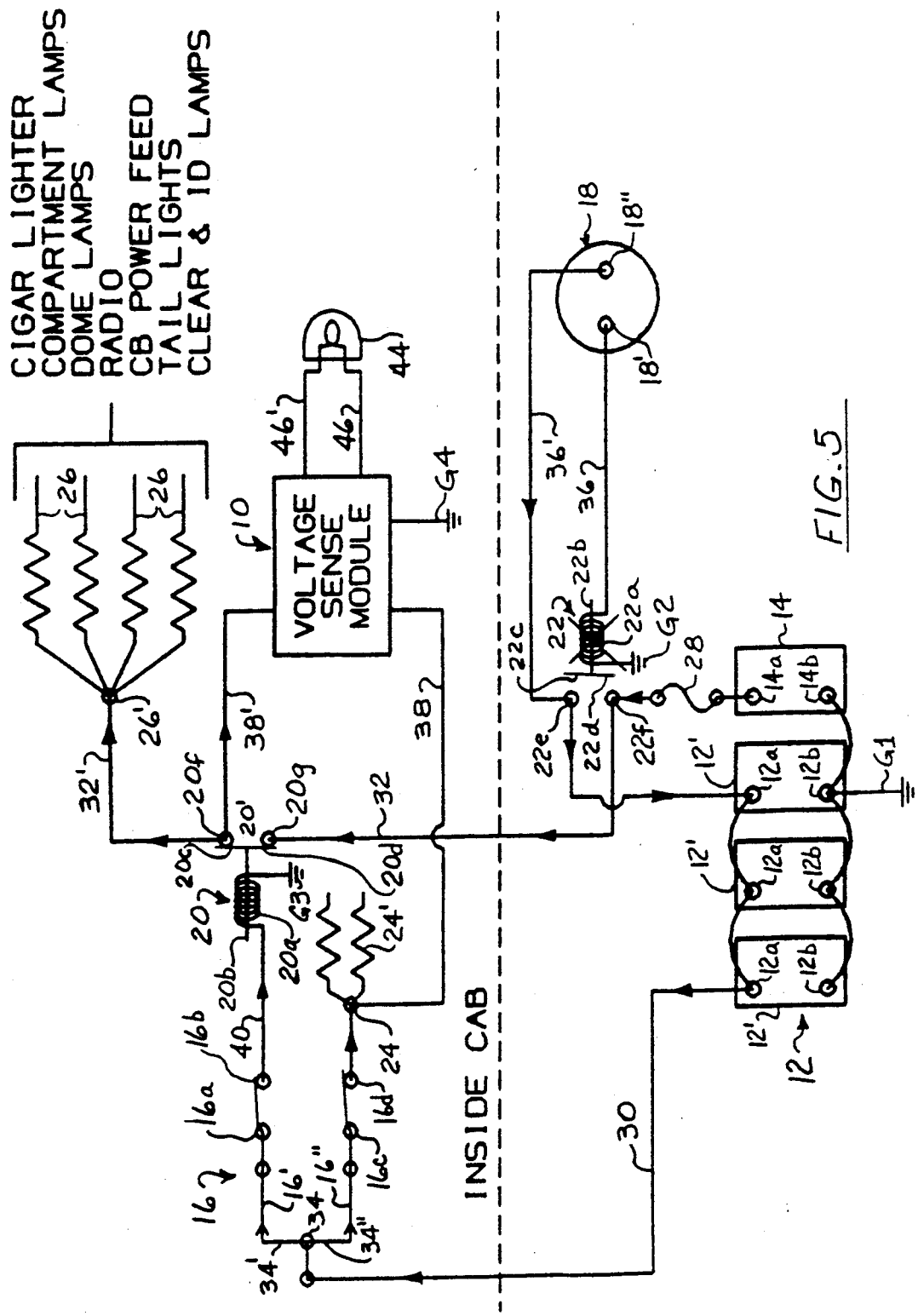

In FIG. 5, the condition illustrated occurs when the engine has been started and is running subsequent to a period of inactivity, such as after an over-night rest stop with the truck in the configuration of FIG. 3 wherein only the accessory switch 16a is on. The battery array 12 feeds operating voltage to the ignition distribution terminal 24 and the auxiliary battery 14 feeds the accessory distribution terminal 26' with solenoid switch 20 closed. However, the solenoid switch 22 is disabled, hence there is a system failure, the alternator 18 being disengaged from the auxiliary battery 14 but not from primary battery array 12. The auxiliary battery 14 remains coupled to the accessory distribution terminal 26' and feeds voltage to the accessory leads 26 and hence to the individual accessories, and therefore can decrease in its charge to a low voltage condition, even though the engine has been started and is operating. The voltage differential between the primary battery array 12 and the auxiliary battery 14 rises to a level which is sensed by the voltage sense monitor 10 and the low voltage warning lamp 44 becomes illuminated. With illumination of the lamp 44, the driver in the vehicle cab is given warning of the existence of such low voltage condition and the system failure and can then take steps to remedy the problem.

Figure 6:
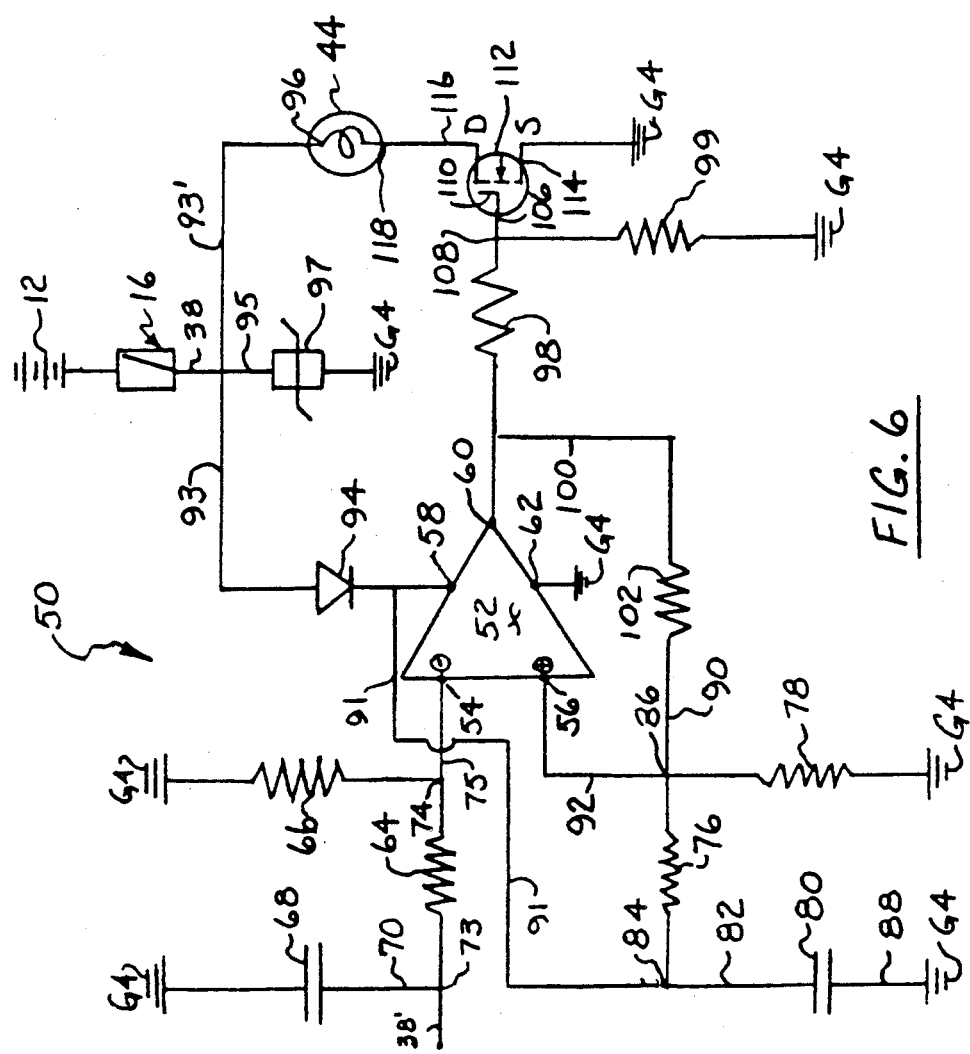

Referring now to FIG. 6, an electrical circuit schematic representation is illustrated in accordance with the invention herein described. The electrical circuit 50 of the voltage differential sensing monitor 10 comprises a high gain operational amplifier 52 (e.g., 741) having an inverting negative input terminal 54, a non-inverting positive input terminal 56, a positive voltage input terminal 58 and an output terminal 60, and a negative voltage input terminal 62 connected to ground. The 741 opamplifier has additional terminals or pins, namely, an offset null pin, an offset null pin and a blank pin (no connection made thereto. These last mentioned pins are not utilized in this application of the 741 op-amplifier. The circuit illustrated in FIG. 6 represents the op-amplifier 52 as a comparator. An auxiliary battery voltage 38' is coupled to a pair of series coupled resistors 64 and 66 functioning as a voltage divider Resistor 64 has a value of 22 K ohms and resistor 66 has a value of 27 K ohms. A capacitor 68 (value 0.1 mfd) is coupled by line 70 to line 38' leading to connection point 73 between the sensed input voltage from the auxiliary battery and resistor 64. The capacitor 68 is coupled to ground G4. Line 74 is connected between resistors 64 and 66 and is coupled by line 75 to the negative input terminal 54 of the op-amplifier 52.

The primary battery array 12 feeds voltage through ignition switch 16, line 93, diode 94, and line 91 into the junction 84 leading to a pair of series resistors 76 and 78 also functioning as a voltage divider, both resistors 76 and 78 having a value of 22 K ohms. Capacitor 80 (value 0.1 mfd) is coupled by line 82 to junction 84, capacitor 80 being coupled to ground G4 by line 88. Line 90 is connected to junction 86 between the pair of resistors 76 and 78. Line 92 leads to noninverting positive voltage input terminal 56 of the op-amplifier 52. Diode 94 couples the primary battery voltage to the positive voltage input terminal 58 of the op-amplifier 52, said diode 94 having a rating of 1000 PIV. Line 93' also leads from the ignition switch 16 to one electrode 96 of warning lamp 44. Line 95 connects the ignition switch 16 to a 20 V metal oxide varistor 97 to protect the circuit, the other end of the varistor being grounded at G4. The output terminal 60 of the op-amplifier 52 is connected to series resistors 98 and 99. Feedback line 100 is connected to positive feedback resistor 102 (value 470 K ohms) with resistor 102 connected to the voltage divider constituted by resistors 76 and 78 at junction 86 to introduce some hysteresis to prevent oscillation. Resistors 98 and 99 function also as a voltage divider to limit the voltage to the gate. Line 106 leads from connection point 108 to the gate electrode 110 of field effect power transistor 112 (e.g. IRF 511), resistor 99 being connected to ground G4. In the example of FIG. 6, resistor 98 has a resistance of 5.1 K ohms and resistor 99 has a resistance of 9.1 K ohms. The source ohmic contact 114 of the n-channel power mosfet 112 is coupled to ground G4 while the drain ohmic contact 116 of the field effect transistor 112 is coupled to the electrode 118 of the warning lamp 44.

The resistors 64 and 66, and 76 and 78 can be described as voltage dividing resistor pairs. For a given input voltage, the voltage division ratio of each resistor pair determines the output voltage of that pair. The values of the resistances in the pairs are preselected to produce equal output voltages to the op-amplifier 52 at inputs 54 and 56 respectively when the voltage at primary input 38 exceeds the voltage at auxiliary input 38' by a predetermined differential. At this point, if the voltage at 38' from the auxiliary battery decreases, the opamplifier produces an output signal at 60 to the mosfet power transistor 112 that will trigger the illumination of the lamp 44. In the example, assuming that the input voltage at 38 from the primary battery array 12 is 13.8 volts, the values of these voltage dividing resistor pairs are selected so that, until the voltage difference with the auxiliary battery input reaches the limit of 1.9 volts, there is no voltage at terminal 60 and no output is directed to the gate 110 of the field effect power transistor 112. However, when the voltage at junction 73 becomes 1.9 or more volts less than the voltage at primary input 38, this causes the op-amplifier 52 to provide a voltage at terminal 60 which turns on the gate 110 of the field effect power transistor 112 which in turn eliminates the resistance between the source 114 and the drain 116 so that current is directed to the electrode of the lamp 44, the field effect power transistor effectively functioning in the manner of a switching means, causing the lamp 44 to become illuminated. Now, the condition of high voltage differential between the battery array and the auxiliary battery over the defined limit is ascertained and the driver warned.

It should be understood that the foregoing description is merely illustrative of a preferred embodiment of the invention, and that the scope of the invention is not limited thereto, but is to be determined by the scope of the claims appended hereto

What we claim is:

1. A voltage differential monitor for use within a vehicle electrical system of the type which includes primary battery means and auxiliary battery means, the primary battery means functioning as an electrical power source for operating the engine of the vehicle and supplied with charging voltage by an alternator, the auxiliary battery means functioning as an electrical power source for accessories at least during downtime of the engine of the vehicle, said monitor comprising voltage sensing input means coupled respectively to said auxiliary battery means and to said primary battery means, voltage comparison means coupled to said input means, switch means coupled to said switch means, said voltage comparison means being constructed and arranged, when said charging voltage is present, to automatically direct an output signal to said switch means when the voltage of said primary battery means exceeds the voltage of said auxiliary battery means by a predetermined voltage differential and said switch means constructed and arranged to energize said alarm means upon receipt of said signal from said voltage comparison means whereby the operator of the vehicle is made aware of the existence of a specific voltage differential condition relative to said auxiliary battery means.

2. The monitor as claimed in claim 1 in which said voltage comparison means comprise a high gain operational amplifier and voltage dividing resistor means interposed between said input means and said amplifier, said resistor means having a predetermined voltage division ratio corresponding to said predetermined voltage differential, which, when output signals from said resistor means which correspond to said predetermined voltage differential are reached at the inputs to the operational amplifier, triggers a voltage output from said amplifier to said switch means.

3. The monitor as claimed in claim 1 in which there is a feed-back loop from the output signal of the comparison means to an sensing input thereof and at least one high value resistor interposed in said loop.

4. The monitor as claimed in claim 1 in which said alarm means comprise a lamp.

5. The monitor as claimed in claim 1 in which said switch means comprise a field effect power transistor having gate, source and drain terminal means, the output signal of the comparison means being delivered to said gate terminal means when the voltage differential between the primary and auxiliary battery means is sensed to be greater than said predetermined voltage differential.

6. The monitor as claimed in claim 5 in which the drain terminal means is coupled to an input of said alarm means.

7. The monitor as claimed in claim 1 in which said comparison means comprise a high gain operational amplifier.

8. A voltage differential monitor for use within a vehicle electrical system of the type which includes primary battery means and auxiliary battery means, the primary battery means functioning as an electrical power source for operating the engine of the vehicle and supplied with charging voltage by an alternator, the auxiliary battery means functioning as an electrical power source for accessories at least during downtime of the engine of the vehicle, said monitor comprising voltage sensing input means coupled respectively to said auxiliary battery means and to said primary battery means, voltage comparison means coupled to said input means, switch means coupled to said voltage comparison means and alarm means coupled to said switch means, said voltage comparison means constructed and arranged to direct an output signal to said switch means when the voltage of said primary battery means exceeds the voltage of said auxiliary battery means by a predetermined voltage differential and said switch means constructed and arranged to energize said alarm means upon receipt of said signal from said voltage comparison means whereby the operator of the vehicle is made aware of the existence of a specific voltage differential condition relative to said auxiliary battery means; the voltage differential level at which the comparison means delivers an output signal to the switch means being determined by the voltage division ratios of resistor pairs disposed between said comparison means and respectively said primary battery means and said auxiliary battery means.

9. The monitor as claimed in claim 1 in which the auxiliary battery means supply the power sufficient to operate the accessories of the vehicle during the period when the vehicle engine is inoperative.

10. In a vehicle electrical system of the type which includes primary battery means and auxiliary battery means, the primary battery means functioning through an ignition switch as an electrical power source for operating the engine of the vehicle and being supplied with charging voltage by an alternator, the auxiliary battery means functioning as an electrical power source for accessories during downtime of the engine of the vehicle, said auxiliary battery means including charging switch means connecting said auxiliary battery means to said alternator when said engine is operating, the improvement comprising a voltage differential monitor continuously coupled respectively to said auxiliary battery means and to said primary battery means upon said ignition being on, said monitor having voltage comparison means having a first auxiliary voltage sensing input and a second primary voltage sensing input, switch means coupled to said voltage comparison means and alarm means coupled to said switch means, said voltage comparison means being disposed to direct a signal to said switch means when said primary voltage input exceeds said auxiliary voltage input by a predetermined voltage differential, and said switch means being disposed to energize said alarm means upon receipt of said signal from said voltage comparison means whereby the operator of the vehicle is made aware of the existence of a low voltage condition of said auxiliary battery means.

11. In a vehicle electrical system of the type which includes primary battery means and auxiliary battery means, the primary battery means functioning as an electrical power source for operating the engine of the vehicle and being supplied with charging voltage by an alternator, the auxiliary battery means functioning as an electrical power source for accessories during downtime of the engine of the vehicle, said auxiliary battery means including charging switch means connecting said auxiliary battery means to said alternator when said engine is operating, the improvement comprising a voltage differential monitor coupled respectively to said auxiliary battery means and to said primary battery means, said monitor having voltage comparison means having a first auxiliary voltage input and a second primary voltage input, switch means coupled to said voltage comparison means and alarm means coupled to said switch means, said voltage comparison means being disposed to direct a signal to said switch means when said primary voltage input exceeds said auxiliary voltage input by a predetermined voltage differential and said switch means being disposed to energize said alarm means upon receipt of said signal from said voltage comparison means whereby the operator of the vehicle is made aware of the existence of a low voltage condition of said auxiliary battery means; said voltage comparison means comprising a high gain operational amplifier and voltage dividing resistor pairs interposed between each of said inputs and said amplifier, each of said resistor pairs having a voltage division ratio which, upon said predetermined voltage differential being exceeded, produce respective input voltages at said amplifier means which trigger an output voltage therefrom to activate said switch means.

12. The invention as claimed in claim 11 in which there is a feed-back loop from the output of the amplifier to the output of one of said resistor pairs and at least one high value resistor interposed in said feed-back loop.

13. The invention as claimed in claim 12 in which said switch means comprise a field effect power transistor having gate, source and drain terminal means, the output voltage of the amplifier being coupled to said gate terminal means to provide low resistance between said source and drain terminals to complete a circuit to said alarm means upon said predetermined voltage differential being attained.

14. The invention as claimed in claim 13 in which said alarm means comprises a lamp connected between said drain terminal and said primary voltage input, said source terminal being connected to ground.

* * * * *